United States Patent [19]

Argyropoulos et al.

[11] Patent Number: 5,412,049
[45] Date of Patent: May 2, 1995

[54] POLYMER COMPOSITIONS CONTAINING HYDROXYL FUNCTIONAL (METH)ACRYLATES AND HYDROXYALKYL CARBAMATE (METH)ACRYLATES AND MIXTURES THEREOF

[75] Inventors: John N. Argyropoulos, Scott Depot; Molly I. Busby, Charleston, both of W. Va.; Jeffrey M. O. Lewis, Farmington Hills, Mich.

[73] Assignee: Union Carbide Chemicals & Plastics Technology Corporation, Danbury, Conn.

[21] Appl. No.: 220,721

[22] Filed: Mar. 31, 1994

[51] Int. Cl.$^6$ ............................................. C08F 26/00
[52] U.S. Cl. ................................. 526/312; 526/320; 526/301
[58] Field of Search ..................... 526/301, 320, 312

[56] References Cited

U.S. PATENT DOCUMENTS

| | | | |
|---|---|---|---|
| 3,479,328 | 11/1969 | Nordstrom | 526/301 |
| 3,674,838 | 7/1972 | Nordstrom | 260/482 C |
| 4,003,751 | 1/1977 | Carder | 106/20 |
| 4,161,596 | 7/1979 | Cowherd et al. | 544/388 |
| 4,279,833 | 7/1981 | Culberston et al. | 260/464 |
| 4,507,188 | 3/1985 | Chu | 204/159.23 |
| 4,588,783 | 5/1986 | Chang | 523/379 |

*Primary Examiner*—Joseph L. Schofer
*Assistant Examiner*—N. Sarofim
*Attorney, Agent, or Firm*—R. M. Allen

[57] ABSTRACT

This invention relates to novel copolymers based on the copolymerization product of hydroxyl (meth)acrylate esters and (meth)acrylate esters of hydroxyalkyl carbamates; and other homopolymers and copolymers base on (meth)acrylate esters. In addition, novel copolymer blends may be formulated from individual copolymers based on hydroxyl (meth)acrylate esters and individual (meth)acrylate esters of hydroxyalkyl carbamates. Mixtures including crosslinking agents may be used to provide curable copolymer or copolymer-blend coating compositions.

12 Claims, No Drawings

POLYMER COMPOSITIONS CONTAINING HYDROXYL FUNCTIONAL (METH)ACRYLATES AND HYDROXYALKYL CARBAMATE (METH)ACRYLATES AND MIXTURES THEREOF

BACKGROUND OF THE INVENTION

The present invention relates to novel copolymers based on (meth)acrylate esters of hydroxyls and (meth)acrylate esters of hydroxyalkyl carbamates, which have been copolymerized with each other, to provide polymers having improved properties.

(Meth)acrylic polymers are known in commerce, and are formed by polymerization of one or more (meth)acrylates. These acrylic polymers can be formed into coatings, inks, and the like that have either a thermoplastic or soluble character or a thermoset or insoluble character. Such products are known to have good hydrolytic stability and other weathering characteristics particularly in comparison to polyesters and polyethers. Even though acrylic polymers have such desirable properties, the coatings industry actively seeks coatings having improved hydrolytic resistance particularly at high and low pH values over those of the current acrylics. Such improved resistance would result in products that have enhanced resistance to hostile environments such as those caused by acid rain, by air-borne chemicals, by cleaners used for dirt removal, by erosion due to dirt particles or other debris, by actinic energy such as from sunlight, and the like.

It is well known that polymers containing free hydroxyl functionality can be crosslinked with various aminoplasts such as hexamethoxymelamine and such aminoplast crosslinking agents are widely used in combination with various polymers including the acrylic polymers described above to provide coatings for a variety of substrates. However, it is believed that coating compositions based on these type polymers and crosslinking agents are less likely to withstand harsh environmental conditions due to the weak ether linkage formed between a reactive group on the crosslinking agent and the hydroxyl group of the polymer to be crosslinked.

The demanding nature of today's marketplace, which is driven by quality, energy, and environmental considerations, has developed a need for coatings with improved resistance to chemical attack from water, acids, alkalis, and the like.

SUMMARY OF THE INVENTION

Applicants have discovered novel copolymers and copolymer blends based on the copolymerization product of one or more (meth)acrylate esters of hydroxyl functional monomers, and one or more (meth)acrylate esters of hydroxyalkyl carbamates. The novel copolymers may also be formed by copolymerizing the individual components and mixing to form copolymer blends. The copolymers or copolymer blends also include other (meth)acrylate homopolymers and copolymers and optionally, may include ethylenically unsaturated monomers.

The term "(meth)acrylate," as used herein, refers to both acrylate and methacrylate polymers and both oligomers of relatively low molecular weight copolymers, copolymers of relatively high molecular weight, and high molecular weight polymers thereof. The term "copolymer" is contemplated to include oligomers and polymers.

In addition, the invention relates to compositions containing the above copolymer or copolymer blends and one or more crosslinking agents reactive with at least one of the carbamate or hydroxyl functionalities present, preferably with both types of functionalities. Suitable catalysts, photoinitiators if cured with ultraviolet light, and the like, as well as optionally wetting agents, fillers, pigments, colorants, fungicides, stabilizers, and the like as are known to those skilled in the art of coating formulation may be included.

Coating, ink, adhesive, and sealant compositions formed from the copolymers or copolymer blends of the present invention can be cured by simple solvent evaporation; by thermal means from solution; by photochemical means; or, if the copolymer has a sufficiently high glass transition temperature, from a powder form.

DETAILED DESCRIPTION OF THE INVENTION

This invention relates to copolymers and copolymer blends comprising novel (meth)acrylate polymers and, optionally, crosslinking agents, and other ingredients known to those skilled in the art of formulation.

The preferred (meth)acrylate copolymers are based on the copolymerization product of (a) one or more hydroxyl functional (meth)acrylate monomers and (b) one or more (meth)acrylate esters of hydroxyalkyl carbamates, along with other (meth)acrylate comonomers.

The preferred hindered-hydroxyl functional (meth)acrylate monomers, component (a), can be prepared, for example, by (i) direct esterification of appropriate diol compound with methacrylic acid or acrylic acid, (ii) reaction of appropriate diol compound with methacrylic anhydride or acrylic anhydride, and (iii) transesterification of appropriate diol compound with alkyl methacrylate or alkyl acrylate, e.g., methyl methacrylate, methyl acrylate, ethyl methacrylate, ethyl acrylate, propyl methacrylate, propyl acrylate, and the like. Such preparation procedures are described in copending U.S. patent application Ser. No. 07/962,559, incorporated herein by reference.

Illustrative hindered-hydroxyl functional (meth)acrylate monomers useful in this invention include, for example, 2-ethyl-3-hydroxyhexyl methacrylate, 1-propyl-2-ethyl-3 hydroxypropyl methacrylate, 1-ethyl-2-methyl-3-hydroxypropyl methacrylate, 2-methyl-3-hydroxypentyl methacrylate, 2,2,4-trimethyl-3-hydroxypentyl methacrylate, 2-propyl-3-hydroxyheptyl methacrylate, 1-butyl-2-propyl-3-hydroxypropyl methacrylate, 2-ethyl-3-hydroxyheptyl methacrylate, 1-butyl-2-ethyl-3-hydroxypropyl methacrylate, 2-propyl-3-hydroxypropyl methacrylate, 2-ethyl-3-hydroxypropyl methacrylate, 1-i-butyl-2-i-propyl-3-hydroxypropyl methacrylate, 2-i-propyl-3-hydroxy-5-methylhexyl methacrylate, 1-methyl-2-i-propyl-3-hydroxypropyl methacrylate, 2-i-propyl-3-methyl-3-hydroxypropyl acrylate, 1-i-butyl-3-hydroxypropyl methacrylate, 3-hydroxy-5-methylhexyl methacrylate, 1-methyl-2-butyl-3-hydroxypropyl methacrylate, 2-butyl-3-hydroxybutyl methacrylate, 1-i-propyl-2,2-dimethyl-3-hydroxypropyl methacrylate, 2,2-dimethyl-3-hydroxy-4-methylpentyl methacrylate, and the like. Preferred hindered-hydroxyl functional (meth)acrylate monomers useful in this invention are obtained from 2,2,4-trimethyl-1,3-pentanediol, 2-methyl-1,3-pentanediol and 2-ethyl-1,3 hexanediol.

Other hydroxyl functional (meth)acrylate monomers, component (a), useful in the present invention may be prepared by methods described in U.S. Pat. No. 3,674,838 such as 1) by the reaction of α,β-unsaturated acids such as acrylic acid, methacrylic acid, α-ethylacrylic acid, α-phenyl acrylic acid, α-benzyl acrylic acid, α-chloro acrylic acids, and the like, with epoxy compounds including 1,2-epoxy aliphatics such as epoxy ethane, ethylene oxide, 1,2-epoxy propane, 1,2-epoxy butance, etc., and other epoxy compounds such as trimethylene oxide, 1,3-epoxy butane, 2,3-epoxy butane, α,α'-epoxy dibenzyl, and tetrahydrofuran; and 2) by the reaction of the above α,β-unsaturated acids with dihydric alcohols having both hydroxyl groups connected to carbon atoms having hydrogen as theonly other substituent. Preferred hydroxyl funtional (meth)acrylate monomers include hydroxy ethyl (meth)acrylate, hydroxy propyl (meth)acrylate and hydroxy butyl (meth)acrylate, hydroxy butyl (meth)acrylates, hydroxy decyl (meth)acrylates, and the like; including caprolactone (meth)acrylates which are the product of reacting an e-carpolactone with a hydroxyalkyl acrylate and which have both acrylate and hydroxyl functionality.

The preferred (meth)acrylate esters of hydroxyalkyl carbamates useful in the practice of this invention include compounds having the formula:

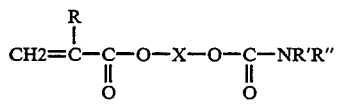

wherein R is hydrogen or methyl; R' is hydrogen; R" is hydrogen or lower alkyl of 1 to 8 carbon atoms; and X is a linear, branched, or cyclic, substituted or unsubstituted hydrocarbyl of 1 to 20 carbon atoms, preferably from 2 to 12 carbon atoms, and most preferably from 2 to 8 carbon atoms.

As used herein, the term "O-carbamate" refers to the compounds of the above Formula I wherein R" is hydrogen; while the term "N-carbamate" refers to compounds of the above Formula I wherein R" is a lower alkyl of 1 to 8 carbon atoms.

(Meth) acrylate esters of hydroxyalkyl carbamates useful in the practice of the present invention may be conveniently prepared by methods known in the art. U.S. Pat. No. 3,674,838 describes methods of preparing O-carbamates (meth)acrylates including by the reaction of a hydroxy functional ester with phosgene to form a chloroformate intermediate; which is then reacted with ammonia to give the desired O-carbamate. Illustrative of useful O-carbamate (meth)acrylates include 2-hydroxy ethyl carbamate (meth)acrylate, 2-hydroxy propyl carbamate (meth)acrylate, and 2-hydroxy butyl carbamate (meth)acrylate.

U.S. Pat. No. 4,126,747 discloses useful N-carbamate (meth)acrylates for the practice of the present invention. Such N-carbamate (meth)acrylates may be prepared by the acid-catalyzed direct esterification of acrylic or methacrylic acid with the desired hydroxyalkyl carbamate such as hydroxy ethyl methacrylate, hydroxy propyl (meth)acrylate, hydroxy butyl methacrylate, and the like. Those skilled in the art are fully familiar with this class of compounds and will appreciate that mixtures can also be used. Illustrative of useful N-carbamate (meth)acrylates include N-methyl-2-hydroxyethyl carbamate (meth)acrylate, N-ethyl-2-hydroxyethyl carbamate (meth)acrylate, N-propyl-2-hydroxyethyl carbamate (meth)acrylate, N-butyl-2-hydroxyethyl carbamate (meth)acrylate, N-methyl-2-hydroxypropyl carbamate (meth)acrylate, N-ethyl-2-hydroxypropyl carbamate (meth)acrylate, N-propyl-2-hydroxypropyl carbamate (meth)acrylate, and N-butyl-2-hydroxypropyl carbamate (meth)acrylate.

X may be any suitable linear, branched, or cyclic, substituted or unsubstituted hydrocarbyl of 1 to 20 carbon atoms, preferably from 2 to 12 carbon atoms, and most preferably from 2 to 8 carbon atoms; including alkyl radicals such as, among others, ethyl, n-propyl, isopropyl, n-butyl, isobutyl, chloropropyl, and nitrobutyl; aryl radicals including benzyl and phenylether; divalent alkyl radicals such as methylene, ethylene, propylene, isopropylene, butylene, isobutylene, dodecamethylene; as well as divalent aryl radicals such as ortho-, meta- and paraphenylene, and -napthalene, and divalent aralkyl radicals such as methylphenylene, ethylphenylene, phenylmethylene and phenylethylene.

The copolymers containing hydroxyl functional (meth)acrylate monomers and hydroxyalkyl carbamate (meth)acrylate may be polymerized in amounts of each component from about 0.1 to 80 weight percent of the total copolymer composition; more preferably from about 1 to 50 weight percent of the total copolymer composition; and most preferably from about 5 to about 50 weight percent of the total copolymer composition.

Suitable comonomers copolymerizable with components (a) and (b) above include acrylic acid, methacrylic acid, the esters of acrylic and methacrylic acid such as the various methyl, ethyl, propyl, butyl, pentyl, hexyl, octyl, decyl, and dodecyl acrylates and the like, including the various isomers of these and other listed compounds; bornyl, isobornyl, norbornyl and isonorbornyl acrylate; 3-(meth)acryloxypropyltris(tri-methylsiloxy) silane; ethoxylated and propoxylated acrylates which are the product of reacting an alkylene oxide illustrative of which are ethylene oxide, propylene oxide, and the like, with an hydroxyalkyl acrylate; cyclohexyl acrylate, 2-phenoxyethyl acrylate, glycidyl acrylate, and the like. Small amounts of up to 5% by weight of di(meth)acrylates or higher functionality (meth)acrylates, such as those found during manufacture of many (meth)acrylates, may be used in the polymerization, though it is preferred that such multifunctional (meth)acrylates be removed using methods know in the art, such as distillation.

Illustrative of ethylenically unsaturated monomers which may optionally be copolymerized with the novel (meth)acrylate esters of the present invention include styrene, vinyl cyclohexane, vinyl cyclohexene, vinyl cyclooctane, N-vinyl-pyrrolidone, vinyl pyridines, vinyl imidazole, vinyl naphthalene, acrylonitrile, methacrylonitrile, vinyl chloride, vinyl fluoride, vinyl bromide, vinylidine fluoride, vinylidine chloride, 5-vinyl-2-norbornene and other vinyl norbornenes; vinyl esters such as vinyl acetate, vinyl trifluoroacetate, vinyl propionates, vinyl butyrates, vinyl pentanoates, vinyl 2-ethylhexanoate, vinyl nonanoates, vinyl decanoates, vinyl neonanoate, vinyl neodecanoate, vinyl neopentanoate and the like; vinyl ethers such as vinyl alcohol which is formed by the hydrolysis of vinyl acetate, vinyl propionates, vinyl triethylene glycol and the like; vinyl acetic acid, 3-vinylbenzyl chloride, 4-vinylbiphenyl, vinyl carbazole, vinyl chloroformate, vinyl crotonate, vinyltrimethylsilane, vinyltrimethoxysilane, vinylferrocene, vinyltributyltin, vinyl sulfonic acid, and the like. Included within the definition of vinyl compounds is maleic anhydride, maleic acid, and maleate esters and half esters.

These other comonomers based on (meth)acrylate homopolymers or copolymers, and optional ethylenically unsaturated monomers may be copolymerized with the functional components (a) and (b) in amounts of from about 0 to 90 weight percent of the total copolymer composition; more preferably from 10 to 80 weight percent of the total copolymer composition; and most preferably from about 20 to 70 weight percent of the total copolymer composition.

The novel (meth)acrylate copolymers of this invention can be prepared by a variety of polymerization techniques illustrative of which are solution polymerization, aqueous emulsion, dispersion, or suspension polymerization, bulk polymerization, nonaqueous emulsion, dispersion, or suspension polymerization, and the like. Said polymerizations can be effected in a variety of reactors illustrative of which are stirred batch reaction, tubular reactors, and the like and can be made of various materials of construction all of which are known to those skilled in the art of conducting such polymerizations.

In a preferred embodiment, the novel (meth)acrylate copolymers of the present invention include the copolymerization product of isomers 2,2,4-trimethyl-3-hydroxypentyl methacrylate and 1-isopropyl-2,2-dimethyl-3-hydroxypropyl methacrylate as component (a) and 2-hydroxyl propyl carbamate methacrylate as component (b); with other (meth)acrylate comonomers such as 2-ethylhexyl acrylate and cyclohexyl methacrylate.

In another embodiment of the present invention, novel (meth)acrylate copolymers are based on the copolymerization product of one or more (meth)acrylate esters of hydroxyalkyl carbamates having the following Formula I:

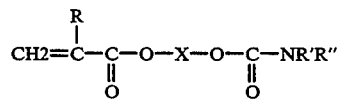
(I)

wherein R, X, R' and R" have the same meaning above, provided at least one of the (meth)acrylate esters of hydroxyalkyl carbamates has R" as a lower alkyl of 1 to 8 carbon atoms.

Illustrative of preferred copolymerizations of an O-carbamate (meth)acrylate and an N-carbamate (meth)acrylate includes the copolymerization of an O-carbamate selected from the group including 2-hydroxy ethyl carbamate (meth)acrylate, 2-hydroxy propyl carbamate (meth)acrylate, and 2-hydroxy butyl carbamate (meth)acrylate; and an N-carbamate (meth)acrylate selected from the group including N-methyl-2-hydroxyethyl carbamate (meth)acrylate, N-ethyl-2-hydroxyethyl carbamate (meth)acrylate, N-propyl-2-hydroxyethyl carbamate (meth)acrylate, Nobutyl-2-hydroxyethyl carbamate (meth)acrylate, N-methyl-2-hydroxypropyl carbamate (meth)acrylate, N-ethyl-2-hydroxypropyl carbamate (meth)acrylate, N-propyl-2-hydroxypropyl carbamate (meth)acrylate, and N-butyl-2-hydroxypropyl carbamate (meth)acrylate; along with the above described suitable comonomers.

The copolymers containing hydroxyalkyl carbamate (meth)acrylate of the above formula may be polymerized in amounts of each component, O-carbamate and N-carbamate, from about 0.1 to 80 weight percent of the total copolymer composition; more preferably from about 1 to 50 weight percent of the total copolymer composition; and most preferably from about 5 to about 50 weight percent of the total copolymer composition. Again, the remaining percentage is made up of comonomers of other (meth)acrylate homopolymers and polymers or the optional ethylenically unsaturated monomers.

In addition, novel copolymers of (meth)acrylates may be formed from the copolymerization product of N-carbamate (meth)acrylates and the above described comonomers; illustrative of which is the copolymerization product of N-methyl-2-hydroxyethyl carbamate (meth)acrylate, Noethyl-2-hydroxyethyl carbamate (meth)acrylate, N-propyl-2-hydroxyethyl carbamate (meth)acrylate, N-butyl-2-hydroxyethyl carbamate (meth)acrylate, N-methyl-2-hydroxypropyl carbamate (meth)acrylate, N-ethyl-2-hydroxypropyl carbamate (meth)acrylate, N-propyl-2-hydroxypropyl carbamate (meth)acrylate, or N-butyl-2-hydroxypropyl carbamate (meth)acrylate, with the above described suitable comonomers such as 2-ethylhexyl acrylate and cyclohexyl methacrylate.

Copolymer blends may be formulated by copolymerizing the individual monomers of components (a) with the desired comonomers, and component (b) with the desired comonomers, to make individual copolymers of (a) and (b); and then physically mixing the two copolymers to make a blend of copolymers.

In another embodiment, novel copolymer blends may be formulated using individual copolymers of an O-carbamate (meth)acrylate and an N-carbamate (meth)acrylate, to yield the desired blend.

Coating compositions containing the above-described copolymers and copolymer blends may be formulated to contain one or more crosslinking agents, preferably one or more of a catalyst or photoinitiator, and optionally one or more of an inert solvent, a surfactant or other flow and leveling agent, a slip agent, pigments and/or other colorants, fillers, and other ingredients known to those skilled in the art of formulation.

Illustrative of crosslinking agents suitable for crosslinking the copolymer or copolymer blend compositions of the invention are aminoplasts including guanidines and polyguanidines, multifunctional isocyanates which term includes blocked isocyanates, phenolics, cycloaliphatic epoxides, glycidyl epoxides; carbodiimides and polycarbodiimides, and the like. Mixtures of the various crosslinking agents can be used as long as there is no interference with the crosslinking function.

Preferred aminoplast crosslinking agents include alkoxymelamines, melamine-formaldehydes, urea-formaldehydes, alkylated benzoguanimines, guanyl ureas, guanidines, biguanidines, polyguanidines, and the like. More preferred compounds include methylated melamine, hexamethoxymethyl-melamine, butylated melamine, methylated/butylated melamine, butylated urea, benzoguanidine, and the like.

Multifunctional isocyanate crosslinking agents may also be used. Illustrative of which are 4,4'-diphenylmethane diisocyanate, 4,4'-dicyclohexyl diisocyanate, 2,4- and 2,6-toluene diisocyanate, isophorone diisocyanate, xylidiene diisocyanate, meta- and para-tetramethylxylene diisocyanate, hexamethylene diisocyanate, 2,2,4- and 2,4,4-trimethylhexamethylene diisocyanate, 4,4',4"-triisocyanato triphenylmethane, biurets of hexamethylene diisocyanate with an average functionality greater than 2, and the like. Multifunctional isocyanates that have been blocked with phenols, caprolactam, methyl ethyl ketone oxime, and the like, are particularly useful for storage stable systems that are thermally cured.

Phenolic crosslinking agents useful in the practice of this invention are the soluble, heat-reactive phenols or cresols such as those described in T. S. Carswell, *Phenoplasts*, pages 9-29, Interscience Publishers Inc., New York (1947) and in J. A. Brydson, *Plastic Materials*, pages 385-386, D. Van Nostrand Co. Inc., New Jersey (1966). Illustrative of soluble, heat-reactive phenolic crosslinking agents are monomers and polymers of alkylated phenol-formaldehyde, alkylated cresol-formaldehyde, including methylated phenol-formaldehyde, butylated phenol-formaldehyde, cresol-formaldehyde, and the like, as well as various heat reactive phenolics made by reacting phenol, propyl phenols, butyl phenols, amyl phenols, and/or higher hydrocarbon phenols, o-, m-, and p-cresol, xylenols, and the like, with formaldehyde in the presence of a suitable catalyst such as ammonia, ethylamine, triethylamine, as well as other phenols which are known in the art of making heat reactive phenolics.

Illustrative of cycloaliphatic epoxide crosslinking agents are 3,4-epoxycyclohexylmethyl 3,4-epoxycyclohexanecarboxylate, 3,4-epoxy-6-methyl-cyclohexylmethyl 3,4-epoxy-6-methylcyclohexane-carboxylate, vinyl cyclohexane diepoxide, cyclohexane diepoxide, cyclopentadiene diepoxide, limonene diepoxide, α-pinene diepoxide, 3,4-epoxycyclohexyl-5,5-spiro-3,4-epoxycyclohexane-m-dioxane, bis(3,4-epoxycyclohexylmethyl)adipate, and the like. Polyfunctional cycloaliphatic epoxides preferred for use in the present invention include those disclosed in U.S. Pat. No. 5,268,489. Small amounts of up to about 25% of monoepoxides can also be used in the formulation. Specific useful monoepoxides are limonene monoepoxide, α-pinene monoepoxide, vinyl 3,4-epoxycyclohexane, norbornene monoepoxide, cyclohexane monoepoxide, 3,4-epoxy derivatives of alkoxylated and/or lactone derivatives of tetrahydrobenzyl alcohol, and the like.

Illustrative of glycidyl epoxide crosslinking agents are the diglycidyl ether of bisphenol A, higher homologs of the diglycidyl ether of bisphenol A, diglycidyl ethers of brominated bisphenol A, 1,4-butanediol diepoxide, epoxy esters, epoxy silanes, epoxy siloxanes, epoxy novolacs, and the like.

Suitable crosslinking agents may be present in the composition in amounts from about 5 to about 55 weight percent based on the total copolymer composition, more preferably from about 15 to 35, and most preferably from about 20 to 30 weight percent.

It is preferable that a catalyst be used for curing or crosslinking of acrylic coating compositions. Illustrative catalysts for thermal curing of the coating compositions when aminoplasts and cycloaliphatic epoxides are used include, among others, p-toluene sulfonic acid and its salts such as ammonium p-toluene sulfonate, diethylammonium sulfonate, diisopropyl-ammonium p-toluene sulfonate, and the like; dodecylbenzene sulfonic acid and its salts such as ammonium dodecylbenzene sulfonate, diethylammonium dodecylbenzene sulfonate, and the like; phosphoric acid and its salts; dinonyl-naphthalene sulfonic acids and their salts such as ammonium dinonylnaphthalene sulfonic acids, dipropylammonium dinonyl-naphthalene sulfonic acids; diethyl-ammonium dinonylnaphthalene sulfonic acids, and the like; boron trifluoride etherate; trimelletic acid; triflic acid and its salts such as diethylammonium triflate, ammonium triflate, diisopropylammonium triflate, and the like; and when isocyanates are used include, among others, zinc octanoate, stannous octanoate, dibutyltin dilaurate, amines, and the like. The triflic acid salts are particularly useful when cycloaliphatic epoxides are used as the crosslinking agents since they allow low temperature curing conditions to be used.

Catalysts may be present in amounts from about 0.1 to 20 weight percent of the total copolymer composition, more preferably from about 0.5 to 10 weight percent, and most preferably from about 1 to 5 weight percent of the total composition.

The formulations of the present invention may also contain a variety of additives including antioxidants, ultraviolet light stabilizers, surfactants or other flow and leveling agents illustrative of which are silicone oils, acrylic polymers such as MODAFLOWS ™ available from Monsanto Co., silicone/alkylene oxides, fluorocarbon surfactants, and the like. In addition, fillers, pigments, thickeners, inert solvents such as toluene, pentyl propionate, 1,1,1-trichloroethane, ethoxyethyl acetate, propoxyethyl acetate, ethoxybutyl acetate, butyl acetate, methyl isobutyl ketone, methyl ethyl ketone, methyl amyl ketone, xylene, and the like may be used; along with inert polymers, waxes, adhesion promoters, and slip agents such as silicone oils, powdered polytetrafluoroethylene alone or in combination with powdered polyethylene and the like. The above optional additives are known to those skilled in the art and many are commercially available.

In a particular embodiment of this invention, photocurable coating compositions are comprised of (meth)acrylate copolymer and/or copolymer blend compositions, cycloaliphatic epoxides, onium salt photoinitiators, and certain optional ingredients. These compositions may be cured with ultraviolet light, preferably ultraviolet light less than about 350 nm.

The optional ingredients may include commercially available materials illustrative of which are the polyester, poly(alkylene oxide), polycaprolactone, and polycarbonate polyols; the glycidyl epoxides; mono- and multifunctional acrylates; surfactant and other flow and leveling agents, fillers, microspheres, solvents, including reactive solvents, and other ingredients such as those previously listed and known to those skilled in the art of formulating photocurable, cationic-initiated coating systems. In addition, N-carbamate (meth)acrylates of Formula I may be used in the above cationic-cure photocure systems as well as in photogenerated free-radical-cure and electron beam-cure systems.

Suitable cation-generating, onium-salt photoinitiators for the photocurable compositions of the invention include one or more aromatic iodonium complex salt or aromatic sulfonium complex salt. Illustrative of such photoinitiators are the complex salts described in U.S. Pat. Nos. 4,231,951, in 4,161,478, in 4,069,055, in 4,058,400, in 4,256,828; the bis(4-(diphenylsulfonio)-phenyl)-sulfide-bis-hexafluorometallic salts such as the phosphate, arsenate, and antimonate salts described by W. R. Watt and coworkers in Journal of Polymer Science: Polymer Chemistry Edition, Vol. 22, page 1789, 1984; and the like. Commercially available photoinitiators of this class include FX-512 (3M Co.), CYRACURE UVI-6990 and UVI-6974 (Union Carbide Corp.), KI-85 (Degussa A. G., Germany), and SP-150 and SP-170 (Asahi Denka, Japan). When photolyzed, these photoinitiators fragment into both cationic species and free radicals. The formulations can optionally contain benzophenone.

Illustrative of photoinitiators useful in noncationic, free-radical initiated radiation-cure systems are 2,2-diethoxy-acetophenone, benzoin ethers, benzophenone, benzophenone in combination with an amine, urea, urethane or other synergist, and the like.

Such photoinitiators may be present in the copolymer composition in amounts from about 0.05 to 10 weight percent, more preferably from 0.1 to 6 weight percent, and most preferably from about 0.2 to 4 weight percent.

Coating compositions of the present invention may be applied to a variety of substrates using any effective, known, means such as spraying, brushing, dipping, roll coating, or other appropriate application methods. Substrates that can be coated include metals such as iron, steel, stainless steel, primed steel, brass, copper, zinc, silver, gold, and the like; wood substrates such as siding, indoor and outdoor trim, paneling, furniture, baseball bats, hockey sticks, pencils, decorative articles, pressboard items, and the like; plastics substrates such as molded sheet-molding compounds, polycarbonates, polyolefins, and the like; paper; glass; and others. Radiation curable systems are particularly useful when curing coatings on plastics and paper.

A preferred embodiment of a coating composition may include, for example, (meth)acrylate copolymers based on the copolymerization product of isomers 2,2,4-trimethyl-3-hydroxypentyl methacrylate and 1-isopropyl-2,2-dimethyl-3-hydroxypropyl methacrylate with 2-hydroxypropyl carbamate (meth)acrylate and other desired comonomers, along with a methylated/-butylated melamine crosslinking agent and a silicone-based surfactant.

Certain of the following preparations and examples are provided to further illustrate this invention.

GLOSSARY OF TERMS

Aminoplast 1 - A hexamethoxymelamine marketed by American Cyanamid as CYMEL TM 303.

Aminoplast 2 - A methylated/butylated melamine marketed by Monsanto Co. as RESIMENE TM 755.

Blocked Isocyanate 1 - A blocked isocyanate, that is thought to be a methyl ethyl ketone oxime blocked trimer of 4,4'cyclohexane-methyl diisocyanate, marketed by Miles, Inc. under the designation Desmodur BL-3174A.

Catalyst 1 - A 40% by weight solution of para-toluene sulfonic acid in methanol.

Catalyst 2 - Dibutyltin dilaurate.

Catalyst 3 - A 25% by weight solution of dodecylbenzene sulfonic acid in methanol.

Solvent 1 - A 97/3 by weight mixture of butyl propionate and isobutanol.

Surfactant 1 - A 25% by weight solution in methyl amyl ketone of a silicone-based surfactant marketed by OSi Specialties Inc. as SILWET TM L-7001.

Surfactant 2 - A 25% by weight solution in methyl amyl ketone of a silicone-based surfactant marketed by OSi Specialties Inc. as SILWET TM L-77.

Surfactant 3 - a silicone-based surfactant marketed by OSi Specialties Inc. as SILWET TM L-7001.

Surfactant 4 - a silicone-based surfactant marketed by OSi Specialties Inc. as SILWET TM L-77.

Photoinitiator 1 - An aryl sulfonium hexafluoroantimonate photoinitiator that is marketed by Union Carbide Chemicals and Plastics Co. Inc. as CYRACURE TM UVI-6974.

In the examples which follow, the cured compositions were evaluated according to one or more of the following procedures:

Gloss is determined at 20° and 60° by the procedure of ASTM D523-85.

Acid Etch Resistance—A Fini automatic transfer pipette is used to place a series of 50 micro-liter droplets of 15% sulfuric acid solution at approximately ¼-inch intervals in two rows along the length of one or more coated panels. Usually two panels are required to provide the length of surface needed to examine the temperature range of 40° to 100° C. that is achieved in the gradient temperature oven. Two rows of spots are used for duplication of the test. The coated panels are placed in an end-to-end position on the heating bank of a BYK Chemie gradient temperature oven and aligning the first spots with the #1 rod which is at 40° C. which results in the various spots being at temperatures that range to 100° C. The sulfuric acid solution droplets are allowed to contact the coating for various times at the indicated temperatures. After the desired heating time, the panels are removed from the gradient oven, cooled to room temperature, rinsed thoroughly with distilled water, lightly patted dry, and evaluated.

Evaluation is by examining the areas that had been covered with the droplets with a 10-power, lighted magnifier. The following are points of comparison observed and recorded for each coating.

a) The lowest temperature spot area with a visible defect in the coating. A "visible defect" is the first sign of any blush, bubbling, yellowing, or other visible change.

b) The lowest temperature spot with a severe defect. A "severe defect" is blistering or complete removal of the coating with the substrate visible. This latter factor means the acidic solution has cut through the coating to the substrate.

c) A scaled 1 to 5 rating of any defect or change occurring specifically in the 50° C., 60° C., and 70° C. areas of the coating using the following rating system.

1 - FAIL. Coating is cut to the substrate or has severe bubbling.

2 - SEVERE. Small blister or bubble present in the coating.

3 - MODERATE. Pinhole defect or slight change in surface of coating by fingertip feeling or visible loss of gloss.

4 - SLIGHT. Blushing or yellowing of coating with no change by fingertip feeling.

5 - UNCHANGED. No visible evidence of any effect.

Pencil Hardness (ASTM D 3363 74): Pencil leads of increasing harness values are forced against the film coating surface in a precisely defined manner until one pencil lead cut through the surface of the film coating. The surface hardness is considered as the hardest pencil grade which just failed to cut through the film coating surface. The pencil leads, in order of softest to hardest, are reported as follows: 6B, 5B, 4B, 3B, 2B, B, HB, F, H, 2H, 3H, 4H, 5H, 6H, 7H, 8H, AND 9H.

Impact Resistance (Forward): A measure of the ability of a cured film coating to resist rupture from a falling weight. A Gardner Impact Tester using an eight-pound dart is used to test film coatings cast and cured on steel panels. The dart is raised to a given height in inches and dropped onto the coating side of the coated panel. The inches times pounds, designated inches-pounds, absorbed by the film without rupturing is recorded as the fil's forward impact resistance.

Impact Resistance (Reverse): Same description as above, except, the dart is dropped onto the uncoated side of the coated panel.

Viscosity is determined using a Brookfield Viscometer and viscosity standards, by the procedure described in ASTM D2196.

EXAMPLES

Preparation A

A mixture of the isomers 2,2,4-trimethyl-3-hydroxypentyl methacrylate and 1-isopropyl-2,2-dimethyl-3-hydroxypropyl methacrylate is prepared by placing 900 grams (6.17 moles) of 2,2,4-trimethyl-1,3-pentanediol (TMPD) in a four-neck, glass reaction flask equipped with a Therm-O-Watch temperature control device, a nitrogen inlet and outlet, a stirrer, and a feeding port. The TMPD is melted and dried by heating to 85° C. while flowing dry nitrogen through the reaction mass for about 2 hours. Then 2.0 grams of methoxyhydroquinone, 2.0 gram of phenothiazine, and 1,139 grams (7.4 moles) of freshly distilled methacrylic anhydride are added. While stirring and employing a nitrogen purge, 40.5 grams of distilled pyridine are added and the reaction mass is heated to and held at 35° C. for about 36 hours. Excess methacrylic anhydride is then quenched by first adding methanol and then washing with water. The mixture of monomethacrylate isomers is separated by fractional distillation from most or all of any di(meth)acrylate that forms as well as from any other impurities. It is expected that about 2% of a di(meth)acrylate will form during the synthesis, having the structure:

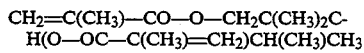

CH$_2$=C(CH$_3$)—CO—O—CH$_2$C(CH$_3$)$_2$C-
H(O—OC—C(CH$_3$)=CH$_2$)CH(CH$_3$)CH$_3$

Preparation B

Preparation of 2-hydroxypropyl carbamate methacrylate. A four-necked, five-liter round-bottomed reaction flask equipped with a thermometer, condenser, mechanical stirrer, and air sparger is charged with 1,920 g (16.1 moles) of 2-hydroxypropyl carbamate, 2,236 g (14.5 moles) of distilled methacrylic anhydride, 83 g of anhydrous pyridine, and 4.2 g (1,000 parts per million) methoxyhydroquinone. The reaction mass is stirred and slowly heated to 65° C. with a hot-water bath. During this heating period and during the course of the reaction, the reaction mass is sparged with air. The reaction mass is held at 65° C. until the concentration of methacrylic anhydride decreased to less than 1.5 percent by weight. The resulting product is then washed with a saturated solution of sodium carbonate, and the aqueous layer removed from the solids by decantation. This washing procedure is repeated two more times to neutralize all of the methacrylic acid. The resulting solid product is then washed twice with a total of two gallons of distilled water. For each wash, the solids are melted by heating the wash water to 50° C. During the washing procedure, the melted solids are well stirred and the aqueous material is allowed to separate from the molten organic material and decanted before the desired product resolidifies. The wet product is dried overnight in a hood to yield 2,000 g of anhydrous 2-hydroxypropyl carbamate methacrylate that analysis indicates has a 97% purity.

Example 1

A two-liter round-bottom reaction flask equipped with a mechanical stirrer, thermometer, two feed lines designated as A and B, and condenser is charged with 100 grams of Solvent 1 while maintaining a nitrogen atmosphere in the reaction flask. A nitrogen atmosphere is maintained throughout the procedure. The reactor is then heated to reflux (~140° C.). A mixture of monomers containing 120.0 grams of the mixture of 2,2,4-trimethyl-3-hydroxypentyl methacrylate and 1-isopropyl-2,2-dimethyl-3-hydroxy-propyl methacrylate prepared in Preparation A, 109.5 grams of 2-ethylhexyl acrylate, 64.5 grams of cyclohexyl methacrylate, and 6.0 grams of methacrylic acid is added through Feed Line A and a mixture of 70.0 grams of Solvent 1 and 10.0 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 0.9 grams of catalyst dissolved in 15 grams of Solvent 1, is added through Feed Line B over a 30 minute period, and the reaction continued at 100° C. for two hours. The resulting transparent solution is cooled to room temperature and stored for analysis and other use. The product has 57.32 percent solids and a viscosity of 89.3 cP. The acrylic copolymer has a number-average molecular weight of 2535, a weight-average molecular weight of 4755, and a polydispersity of 1.88, as determined by gel permeation chromatography using polystyrene standards.

Example 2

In the same general manner described in Example 1, the reactor is charged with 50 grams of Solvent 1 while maintaining a nitrogen atmosphere in the reaction flask. A nitrogen atmosphere is maintained throughout the procedure. The reactor is then heated to reflux (~140° C.). A mixture of monomers containing 121.1 grams 2-hydroxypropyl carbamate methacrylate (Preparation B), 143.59 grams of 2-ethylhexyl acrylate, 74.39 grams of cyclohexyl methacrylate, 6.92 grams of methacrylic acid, and 196 grams of Solvent 1 is added through Feed Line A, and a mixture of 80.7 grams of Solvent 1 and 11.5 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1, and the reaction mixture held at 140° C. for an additional 30 minutes. Then the reactor is cooled to 100° C., and a post high-temperature-reaction addition of a mixture containing 1.0 grams of catalyst dissolved in 17.3 grams of Solvent 1 is added through Feed Line B over a 30 minute period, and the reaction continued at 100° C. for two hours. The resulting transparent solution is cooled to room temperature and stored for analysis and other use. The product has 57.9 percent solids and a viscosity of 535 cP. The acrylic copolymer has a number-average molecular weight of 2851, a weight-average molecular weight of 4969, and a polydispersity of 1.74, as deter-

Example 3

In the same general manner described in Example 1, the reactor is charged with 59.5 grams of Solvent 1 while maintaining a nitrogen atmosphere in the reaction flask. A nitrogen atmosphere is maintained throughout the procedure. The reactor is then heated to reflux (~140° C.). A mixture of monomers containing 61.75 grams 2-hydroxypropyl carbamate methacrylate (Preparation B), 82.35 grams of a mixture of 2,2,4-trimethyl-3-hydroxypentyl methacrylate and 1-isopropyl-2,2-dimethyl-3-hydroxy-propyl methacrylate (Preparation A), 160.58 grams of 2-ethylhexyl acrylate, 98.82 grams of cyclohexyl methacrylate, 8.23 grams of methacrylic acid, and 99.5 grams of Solvent 1 is added through Feed Line A, and a mixture of 96.0 grams of Solvent 1 and 13.7 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 1.19 grams of catalyst dissolved in 20.6 grams of Solvent 1 is added through Feed Line B over a 30 minute period, and the reaction continued at 100° C. for two hours. The resulting transparent solution is cooled to room temperature and stored for analysis and other use. The product has 56.89 percent solids and a viscosity of 73.1 cP. The acrylic copolymer has a number-average molecular weight of 2268, a weight-average molecular weight of 3716, and a polydispersity of 1.64, as determined by gel permeation chromatography using polystyrene standards.

Example 4

In the same general manner described in Example 1, the reactor is charged with 50 grams of Solvent 1 while maintaining a nitrogen atmosphere in the reaction flask. A nitrogen atmosphere is maintained throughout the procedure. The reactor is then heated to reflux (~140° C.). A mixture of monomers containing 41.52 grams of 2-hydroxyethyl methacrylate, 60.55 grams 2-hydroxypropyl carbamate methacrylate (Preparation B), 134.94 grams of 2-ethylhexyl acrylate, 102.07 grams of cyclohexyl methacrylate, 6.92 grams of methacrylic acid, and 84 grams of Solvent 1 is added through Feed Line A and a mixture of 80.7 grams of Solvent 1 and 11.5 grams of t-amylperoxy-acetate catalyst {Lupersol 555M60(60TS)} is added through Feed Line B with both additions taking place over a 4-hour time period. After the additions are completed, Feed Line A is flushed with 17.3 grams of Solvent 1, and the reaction mixture held at 140° C. for an additional 30 minutes. Then the reactor is cooled to 100° C., and a post high-temperature-reaction addition of a mixture containing 1.0 grams of catalyst dissolved in 17.3 grams of solvent is added through Feed Line B over a 30 minute period, and the reaction continued at 100° C. for two hours. The resulting transparent solution is cooled to room temperature and stored for analysis and other use. The product has 57.12 percent solids and a viscosity of 300 cP. The acrylic copolymer has a number-average molecular weight of 3071, a weight-average molecular weight of 6061, and a polydispersity of 1.97, as determined by gel permeation chromatography using polystyrene standards.

Example 5

In the same general manner described in Example 1, the reactor is charged with 100 grams of Solvent 1 while maintaining a nitrogen atmosphere in the reaction flask. A nitrogen atmosphere is maintained throughout the procedure. The reactor is then heated to reflux (~140° C.). A mixture of monomers containing 120.0 grams of a mixture of 2,2,4-trimethyl-3-hydroxypentyl methacrylate and 1-isopropyl-2,2-dimethyl- 3-hydroxypropyl methacrylate (Preparation A), 103.5 grams of propylheptyl acrylate, 70.5 grams of cyclohexyl methacrylate, and 6.0 grams of methacrylic acid is added through Feed Line A, and a mixture of 70.0 grams of Solvent 1 and 10.0 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1, and the reaction mixture is held at 140° C. for an additional 30 minutes. Then the reactor is cooled to 100° C., and a post high-temperature-reaction addition of a mixture containing 0.9 grams of catalyst dissolved in 15.0 grams of Solvent 1 is added through Feed Line B over a 30 minute period, and the reaction continued at 100° C. for two hours. The resulting transparent solution is cooled to room temperature and stored for analysis and other use. The product has 56.84 percent solids and a viscosity of 83.3 cP. The acrylic copolymer has a number-average molecular weight of 2436, a weight-average molecular weight of 3893, and a polydispersity of 1.60, as determined by gel permeation chromatography using polystyrene standards.

Example 6

In the same general manner described in Example 1, the reactor is charged with 100 grams of Solvent 1 while maintaining a nitrogen atmosphere in the reaction flask. A nitrogen atmosphere is maintained throughout the procedure. The reactor is then heated to reflux (~140° C.). A mixture of monomers containing 69.2 grams of a mixture of 2,2,4-trimethyl-3-hydroxypentyl methacrylate and 1-isopropyl-2,2-dimethyl-3-hydroxypropyl methacrylate (Preparation A), 51.9 grams 2-hydroxypropyl carbamate methacrylate (Preparation B), 128.02 grams of propylheptyl acrylate, 89.96 grams of cyclohexyl methacrylate, and 6.92 grams of methacrylic acid is added through Feed Line A, and a mixture of 80.7 grams of Solvent 1 and 11.5 grams of t-amylperoxyacetate catalyst {Lupersol 555M60(60TS)} was added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 1.0 grams of catalyst dissolved in 17.3 grams of Solvent 1 is added through Feed Line B over a 30 minute period and the reaction continued at 100° C. for two hours. The resulting transparent solution is cooled to room temperature and stored for analysis and other use. The product has 56.84 percent solids and a viscosity of 139 cP. The acrylic copolymer has a number-average molecular weight of 2545, a weight-average molecular weight of 4254, and a polydispersity of 1.67, as determined by gel permeation chromatography using polystyrene standards.

Example 7

In the same general manner described in Example 1, the reactor is charged with 59.5 grams of Solvent 1 while maintaining a nitrogen atmosphere in the reaction flask. A nitrogen atmosphere is maintained throughout the procedure. The reactor is then heated to reflux (~140° C.). A mixture of monomers containing 69.00 grams N-butyl 2-hydroxyethyl carbamate (meth)acrylate, 60.0 grams of a mixture of 2,2,4-trimethyl-3-hydroxypentyl methacrylate and 1-isopropyl-2,2-dimethyl-3-hydroxy-propyl methacrylate (Preparation A), 94.5 grams isodecyl methacrylate, 70.5 grams isobornyl methacrylate and 6.0 grams of methacrylic acid, and 99.5 grams of Solvent 1 is added through Feed Line A, and a mixture of 96.0 grams of Solvent 1 and 13.7 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 1.19 grams of catalyst dissolved in 20.6 grams of Solvent 1 is added through Feed Line B over a 30 minute period, and the reaction continued at 100° C. for two hours. The resulting transparent solution is cooled to room temperature and stored for analysis and other use. The product has 57.49 percent solids and a viscosity of 1500 cP. The acrylic copolymer has a number-average molecular weight of 5826, a weight-average molecular weight of 18545, and a polydispersity of 3.18, as determined by gel permeation chromatography using polystyrene standards.

Examples 8–14

The acrylic-solution polymers of Examples 1–7 were formulated in a 3 to 1 ratio by weight with Aminoplast 2 crosslinking agent. To each of these mixtures, 1.6 percent by weight of Catalyst 3, 0.5% Surfactant 1, and 0.5% Surfactant 2 are added and then well mixed. The resultant liquid coating formulations are applied to steel panels with a wire-wound draw-down rod and baked for 30 minutes in a 140° C. oven. The resulting coatings have the following properties:

| | EXAMPLE | | | | | | |
|---|---|---|---|---|---|---|---|
| | 8 | 9 | 10 | 11 | 12 | 13 | 14 |
| Copolymer of Example | 1 | 2 | 3 | 4 | 5 | 6 | 7 |
| TEST | | | | | | | |
| GLOSS 20°/60° | 85.8/ 95.9 | 85.9/ 96.0 | 86.1/ 95.9 | 86.6/ 96.5 | 85.8/ 96.0 | 85.9/ 96.0 | 86.7/ 96.2 |
| ACID ETCH Visible/Severe | 73/ 84 | 69/ 80 | 74/ 86 | 70/ 82 | 69/ 77 | 73/ 84 | 68/ 78 |
| PENCIL HARDNESS | HB/ HB | HB/ HB | HB/ HB | B/ B | B/ B | HB/ HB | F |
| IMPACT Forward/Reverse | 40/ <5 | 28/ <5 | 48/ <5 | 30/ <5 | 43/ <5 | 33/ <5 | 25/ <5 |
| Viscosity of Copolymer | 89.3 | 535 | 73.1 | 300 | 83.3 | 139 | 15 |

Example 15

The liquid coating formulations from Example 8 and Example 9 are blended in a 1 to 1 ratio by weight and then coated and cured in the same manner as cured coatings from Example 8 through 14. The resulting coating has a Gloss (20°/60°) of 86.1/96.2, an acid etch (visible/severe) of 72/84, a pencil hardness of HB/HB, and an impact (forward/reverse) of 33/<5 in-lbs. These results demonstrate that polymers containing only hindered hydroxyl functionality (Example 1 copolymer) can be successfully blended and cured with polymers containing O-carbamate functionality (Example 2 copolymer).

Example 16

An oligomeric copolymer that contains both free hydroxyl and free O-carbamate functionality is prepared from a 450-gram mixture of the Preparation A hindered-hydroxyl (meth)acrylate mixture, Preparation B hydroxyalkyl carbamate methacrylate, butyl acrylate, and methyl methacrylate. A chain transfer agent, 3-mercapto-1-propanol, is included in the monomer mixture. The initial pentyl propionate solvent is placed in a 2-liter, four-neck, glass reaction flask equipped with a mechanical stirrer, a Thermo-watch heat controller, a nitrogen sparger, a water-cooled condenser, and 500-milliliter and 125-milliliter addition funnels. A nitrogen sparge is maintained throughout the procedure. The solvent is heated to 125° C., and the monomer mixture is fed by means of a piston pump to the flask over a four-hour period while controlling the temperature at 125° C. Concurrently, the initiator mixture consisting of t-amyl peroxyacetate initiator dissolved in pentyl propionate is fed to the reaction flask by means of a second piston pump over the same time period. The two feeds are introduced into the reactor below the liquid surface and from opposite sides of the reactor. After completion of the feeding step, the monomer line is flushed with pentyl propionate, and the reaction is allowed to proceed for 30 minutes at 125° C. Then a second initiator feed consisting of a mixture of t-amyl peroxyacetate dissolved in pentyl propionate is fed to the reaction mass, and the reaction is allowed to proceed for an additional 2 hours at 125° C. The solution of oligomeric copolymer that contains both free hydroxyl and free O-carbamate functionality is cooled to room temperature and stored for future use.

| | |
|---|---|
| Initial pentyl propionate solvent, g | 150.0 |
| Monomer Mixture, g*** | |
| Preparation A hydroxyalkylacrylate methacrylate | 90.0 |
| Preparation B hydroxypropyl carbamate methacrylate | 90.0 |
| Butyl acrylate | 135.0 |
| Methyl methacrylate | 135.0 |
| 3-Mercapto-1-propanol* | 2.70 |
| Initiator Mixture, g | |
| Pentyl propionate | 95.0 |
| t-Amylperoxyacetate** | 27.0 |
| Monomer Line Flush | |
| Pentyl propionate, g | 25.0 |
| Second Initiator Mixture, g | |
| Pentyl propionate | 25.0 |
| t-Amylperoxyacetate** | 2.5 |

*Chain transfer agent
**Lupersol 555M60(60TS)
***The indicated Monomer Mixture is prepared, and 450 grams of the mixture is used prepare the copolymer.

Example 17

Twenty grams of the oligomeric copolymer of Example 1, 3.8 grams of Aminoplast 1, 0.24 grams of Surfactant 1, 0.24 grams of Surfactant 2, 2.0 grams of methyl amyl ketone solvent, and 0.5 gram of Catalyst 1 are placed in a glass container and well stirred. This thermally-curable coating system is coated onto a steel substrate with a No. 20 wire-wound rod and cured at 145° C. for 30 minutes. A clear coating with good properties results.

Example 18

Thirty grams of the oligomeric copolymer of Example 1, 60 grams of 3,4-epoxycyclohexyl 3,4-epoxycyclohexane carboxylate, and 3.0 grams of Photoinitiator 1 are added to an amber-colored glass container. The ingredients are well mixed and then applied to a steel panel by the draw-down method using a No. 20 wire-wound rod. The coated panel is then placed on a conveyor moving at 30 feet/minute and cured by passing it under a 300 watt-per-inch medium-pressure mercury-vapor lamp. A tack-free, clear coating results.

Example 19

Fifteen grams of the oligomeric copolymer of Example 1, 40 grams of 3,4-epoxycyclohexyl 3,4-epoxycyclohexane carboxylate, 0.3 grams of diethylammonium triflate catalyst, and 10 grams of methyl amyl ketone solvent are added to a glass container and well mixed. The mixture is coated onto a steel panel with a No. 22 wire-wound rod. The coated panel is allowed to air dry for 10 minutes, and then it is oven baked at 140° C. for 15 minutes. A clear, tack-free coating with good water resistance results.

Example 20

In the same general manner described in Example 1, the reactor is charged with 100 grams of Solvent 1 while maintaining a nitrogen atmosphere in the reaction flask. A nitrogen atmosphere is maintained throughout the procedure. The reactor is then heated to reflux (~140° C.). 300 grams of a mixture of monomers containing 40 percent N-butyl-2-hydroxyethyl carbamate (meth)acrylate, 36.5% 2-ethylhexyl acrylate, 21.5% cyclohexyl methacrylate, and 2 percent methacrylic acid, wherein said percentages are weight percentages, are added through Feed Line A and a mixture of 70.0 grams of Solvent 1 and 10.0 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 0.9 grams of catalyst dissolved in 15.0 grams of solvent is added through Feed Line B over a 30 minute period and the reaction continued at 100° C. for two hours. The resulting transparent solution is cooled to room temperature and stored for analysis and other use. The product has 58.27 percent solids and a viscosity of 168 cP. The acrylic copolymer has a number-average molecular weight of 3108, a weight-average molecular weight of 5874, and a polydispersity of 1.89, as determined by gel permeation chromatography using polystyrene standards.

Example 21

Three parts by weight of the acrylic solution polymer of Example 20 is mixed with one part by weight with Aminoplast 2. To this mixture, 1.6 % by weight of Catalyst 3, 0.5% of Surfactant 3, and 0.5% of Surfactant 4 are added. The ingredients are well mixed, applied to steel substrate by the draw-down technique, and baked in a forced-air oven at 140° C. for 30 minutes. At room temperature, the coatings have the following properties: pencil hardness HB; impact resistance (direct/forward) 40/<5 in.lbs; gloss (20°/60°) 88.1/97.1; acid etch resistance (visible/severe) 70/77; solvent resistance >300 double methyl ethyl ketone rubs.

Example 22

In the same general manner described in Example 1, the reactor is charged with 100 grams of Solvent 1 while maintaining a nitrogen atmosphere in the reaction flask. A nitrogen atmosphere is maintained throughout the procedure. The reactor is then heated to reflux (~140° C.). 300 grams of a mixture of monomers containing 22.7% N-butyl-2-hydroxyethyl carbamate (meth)acrylate, 17.5% of a mixture of the isomers 2,2,4-trimethyl-3-hydroxypentyl methacrylate and 1-isopropyl-2,2-dimethyl-3-hydroxypropyl methacrylate (Preparation A), 33.8% isodecyl methacrylate, 24.0% isobornyl methacrylate, and 2 percent methacrylic acid, wherein said percentages are weight percentages, are added through Feed Line A and a mixture of 70.0 grams of Solvent 1 and 10.0 grams of t-amylperoxyacetate catalyst {Lupersol 555M60(60TS)} is added through Feed Line B with both additions taking place over a 4-hour time period. After the additions are completed, Feed Line A is flushed with 15 grams of Solvent 1 and the reaction mixture held at 140° C. for an additional 30 minutes. Then the reactor is cooled to 100° C., and a post high-temperature-reaction addition of a mixture containing 0.9 grams of catalyst dissolved in 15.0 grams of solvent is added through Feed Line B over a 30 minute period and the reaction continued at 100° C. for two hours. The resulting transparent solution is cooled to room temperature and stored for analysis and other use. The product has 59.0 percent solids and a viscosity of 6200 cP. The acrylic copolymer has a number-average molecular weight of 5787, a weight-average molecular weight of 22,020, and a polydispersity of 3.8, as determined by gel permeation chromatography using polystyrene standards. It is unexpected that a polymer of this molecular weight has a relatively low viscosity at 59.0% solids.

Example 23

Three parts by weight of the acrylic solution polymer of Example 22 is mixed with one part by weight Aminoplast 2. To this mixture, 1.6% by weight of Catalyst 3, 0.5% by weight of Surfactant 3, and 0.5% by weight of Surfactant 4 are added. The ingredients are well mixed, applied to steel substrate by the draw-down technique, and baked in a forced-air oven at 140° C. for 30 minutes. At room temperature, the coatings have the following properties: pencil hardness F; impact resistance (direct/forward) 20/<5 in.lbs; gloss (20°/60°) 86.2/96.1; acid etch resistance (visible/severe) 74/79; solvent resistance >1000 double methyl ethyl ketone rubs.

What is claimed is:

1. A copolymer composition comprising (meth)acrylate copolymers based on the copolymerization product of (a) one or more hydroxyl functional (meth)acrylate monomers and (b) one or more (meth)acrylate esters of hydroxyalkyl carbamates, with other (meth)acrylate comonomers.

2. The copolymer composition of claim 1 wherein the one or more hydroxyl functional (meth)acrylate monomers is a hindered-hydroxyl functional (meth)acrylate monomer.

3. The copolymer composition of claim 2 wherein the hindered-hydroxyl function (meth)acrylate monomers is selected from the group consisting of 2-ethyl-3-hydroxyhexyl methacrylate, 1-propyl-2-ethyl-3 hydroxypropyl methacrylate, 1-ethyl-2-methyl-3-hydroxypropyl methacrylate, 2-methyl-3-hydroxypentyl methacrylate, 2,2,4-trimethyl-3-hydroxypentyl methacrylate, 2-propyl-3-hydroxyheptyl methacrylate, 1-butyl-2-propyl-3-hydroxypropyl methacrylate, 2-ethyl-3-hydroxyheptyl methacrylate, 1-butyl-2-ethyl-3-hydroxypropyl methacrylate, 2-propyl-3-hydroxypropyl methacrylate, 2-ethyl-3-hydroxypropyl methacrylate, 1-i-butyl-2-i-propyl-3-hydroxypropyl methacrylate, 2-i-propyl-3-hydroxy-5-methylhexyl methacrylate, 1-methyl-2-i-propyl-3-hydroxypropyl methacrylate, 2-i-propyl-3-methyl-3-hydroxypropyl acrylate, 1-i-butyl-3-hydroxypropyl methacrylate, 3-hydroxy-5-methylhexyl methacrylate, 1-methyl-2-butyl-3-hydroxypropyl methacrylate, 2-butyl-3-hydroxybutyl methacrylate, 1-i-propyl-2,2-dimethyl-3-hydroxypropyl methacrylate, and 2,2-dimethyl-3-hydroxy-4-methylpentyl methacrylate.

4. The copolymer composition of claim 2 wherein the hindered-hydroxyl functional (meth)acrylate monomers is a mixture of isomers of 2,2,4-trimethyl-3-hydroxypentyl methacrylate and 1-isopropyl-2,2-dimethyl-3-hydroxypropyl methacrylate.

5. The copolymer composition of claim 1 wherein the one or more hydroxyl functional (meth)acrylate monomers is a hydroxyl functional (meth)acrylate monomer selected from the group consisting of hydroxy ethyl (meth)acrylate, hydroxy propyl (meth)acrylate and hydroxy butyl (meth)acrylate, hydroxy butyl (meth)acrylates, hydroxy decyl (meth)acrylates, and caprolactone (meth)acrylates.

6. The copolymer composition of claim 1 wherein the one or more (meth)acrylate esters of hydroxylalkyl carbamates has the Formula:

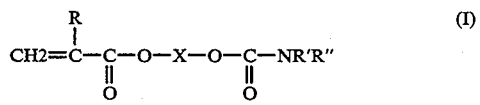
(I)

wherein R is hydrogen or methyl; R' is hydrogen; R" is hydrogen or lower alkyl of 1 to 8 carbon atoms; and X is a linear, branched, or cyclic, substituted or unsubstituted hydrocarbyl of 1 to 20 carbon atoms, preferably from 2 to 12 carbon atoms, and most preferably from 2 to 8 carbon atoms.

7. The copolymer composition of claim 6 wherein the hydroxyalkyl carbamate is an O-carbamate (meth)acrylate selected from the group consisting of 2-hydroxy ethyl carbamate (meth)acrylate, 2-hydroxy propyl carbamate (meth)acrylate, and 2-hydroxy butyl carbamate (meth)acrylate.

8. The copolymer composition of claim 6 wherein the hydroxyalkyl carbamate is an N-carbamate (meth)acrylate selected from the group consisting N-methyl-2-hydroxyethyl carbamate (meth)acrylate, N-ethyl-2-hydroxyethyl carbamate (meth)acrylate, N-propyl-2-hydroxyethyl carbamate (meth)acrylate, N-butyl-2-hydroxyethyl carbamate (meth)acrylate, N-methyl-2-hydroxypropyl carbamate (meth)acrylate, N-ethyl-2-hydroxypropyl carbamate (meth)acrylate, N-propyl-2-hydroxypropyl carbamate (meth)acrylate, and N-butyl-2-hydroxypropyl carbamate (meth)acrylate.

9. The copolymer composition of claim 1 wherein said other comonomers based on (meth)acrylate are selected from the group consisting of acrylic acid, methacrylic acid, the esters of acrylic and methacrylic; bornyl, isobornyl, norbornyl and isonorbornyl acrylate; 3-(meth)acryloxypropyltris(tri-methylsiloxy) silane; ethoxylated and propoxylated acrylates which are the product of reacting an alkylene oxide with an hydroxyalkyl acrylate; cyclohexyl acrylate, 2-phenoxyethyl acrylate, glycidyl acrylate, di(meth)acrylates or higher functionality (meth)acrylates.

10. The copolymer composition of claim 1 further comprising ethylenically unsaturated monomers copolymerized with said component (a) and component (b) and other (meth)acrylate comonomers.

11. The copolymer composition of claim 1 wherein component (a) is a mixture of isomers of 2,2,4-trimethyl-3-hydroxypentyl methacrylate and 1-isopropyl-2,2-dimethyl-3-hydroxypropyl methacrylate and component (b) is 2-hydroxypropyl carbamate methacrylate.

12. The copolymer composition of claim 1 wherein component (a) is a mixture of isomers of 2,2,4-trimethyl-3-hydroxypentyl methacrylate and 1-isopropyl-2,2-dimethyl-3-hydroxypropyl methacrylate and component (b) is N-butyl-2-hydroxyethyl carbamate methacrylate.

* * * * *

Adverse Decision in Interference

Patent No. 5,412,049, John N. Argyropoulos, Molly I-Chin Busby, Jeffrey M. O. Lewis, POLYMER COMPOSITIONS CONTAINING HYDROXYL FUNCTIONAL (METH)ACRYLATES AND HYDROXY-ALKYL CARBAMATE (METH)ACRYLATES AND MIXTURES THEREOF, Interference No. 104,465, final judgment adverse to the patentees rendered September 22, 2000, as to claims 1-3 and 5-10.

*(Official Gazette January 9, 2001)*